United States Patent Office 3,285,925
Patented Nov. 15, 1966

3,285,925
AMINO-TRICHLOROPICOLINIC ACID
COMPOUNDS
Howard Johnston, Walnut Creek, and Mary S. Tomita, Glendale, Calif., assignors to The Dow Chemical Company, Midland, Mich., a corporation of Delaware
No Drawing. Filed Apr. 15, 1964, Ser. No. 360,063
10 Claims. (Cl. 260—294.9)

This application is a continuation-in-part of copending application Serial No. 233,442, now abandoned, which in turn is a continuation-in-part of copending application, Serial No. 177,754, now abandoned.

The invention is concerned with 4-amino-3,5,6-trichloropicolinic acid compounds represented by the formula

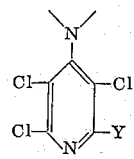

(I)

In this and succeeding formulas, Y is a carboxylic acid derived group such as carboxyl, nitrile, or carboxylic acid salt, amide, hydrazide or ester group, and N< is an amino group wherein each of the free valences is connected to one of carbon, hydrogen or nitrogen.

Representative materials falling within the scope of this definition include 4-amino-3,5,6-trichloropicolinic acid,
3,5,6-trichloro-4-methylaminopicolinic acid,
3,5,6-trichloro-4-pyrrolidinopicolinic acid,
3,5,6-trichloro-4-dimethylaminopicolinic acid,
methyl 4-amino-3,5,6-trichloropicolinate,
isooctyl 4-amino-3,5,6-trichloropicolinate,
n-hexyl 4-amino-3,5,6-trichloropicolinate,
2-hydroxyethyl 4-amino-3,5,6-trichloropicolinate,
isobutyl 4-amino-3,5,6-trichloropicolinate,
2-ethylhexyl 4-amino-3,5,6-trichloropicolinate,
allyl 4-amino-3,5,6-trichloropicolinate,
2-(2,4-dichlorophenoxy)propyl 4-amino-3,5,6-trichloropicolinate,
stearyl 4-amino-3,5,6-trichloropicolinate,
2,4,5-trichlorophenyl 4-amino-3,5,6-trichloropicolinate,
2-nitroethyl 4-amino-3,5,6-trichloropicolinate,
benzyl 3,5,6-trichloro-4-methylaminopicolinate,
phenyl 3,5,6-trichloro-4-methylaminopicolinate,
n-decyl 3,5,6-trichloro-4-hydrazinopicolinate,
phenyl 3,5,6-trichloro-4-hydrazinopicolinate,
benzyl 3,5,6-trichloro-4-hydrazinopicolinate,
3,5,6-trichloro-4-hydrazinopicolinamide,
4-amino-3,5,6-trichloro-N-(2-hydroxypropyl) picolinamide,
4-allylamino-3,5,6-trichloropicolinamide,
sodium 4-amino-3,5,6-trichloropicolinate,
ammonium 3,5,6-trichloro-4-hydrazinopicolinate,
sodium 3,5,6-trichloro-4-hydrazinopicolinate,
calcium 3,5,6-trichloro-4-hydrazinopicolinate,
3,5,6-trichloro-4-hydrazinopicolinonitrile,
4-allylamino-3,5,6-trichloropicolinonitrile,
3,5,6-trichloro-4-propargylaminopicolinonitrile,
methyl 3,5,6-trichloro-4-methylaminopicolinate,
3,5,6-trichloro-4-dimethylaminopicolinic acid,
2-hydroxyethylammonium 4-amino-3,5,6-trichloropicolinate,
methyl 3,5,6-trichloro-4-propargylaminopicolinate,
2-hydroxyethyl 3,5,6-trichloro-4-propargylaminopicolinate,
propargyl 3,5,6-trichloro-4-propargylaminopicolinate,
allyl 3,5,6-trichloro-4-allylaminopicolinate,
n-propyl 3,5,6-trichloro-4-allylaminopicolinate,
n-pentyl 4-amino-3,5,6-trichloropicolinate,
tris(2-hydroxyethyl)ammonium 4-amino-3,5,6-trichloropicolinate,
n-propyl 4-amino-3,5,6-trichloropicolinate,
n-butyl 4-amino-3,5,6-trichloropicolinate,
tris(2-hydroxypropyl)ammonium 4-amino-3,5,6-trichloropicolinate,
ethyl 4-amino-3,5,6-trichloropicolinate,
isopropyl 4-amino-3,5,6-trichloropicolinate, etc.

Additional representative preferred materials also include 2,3,6-trichloro-4-pyridyl 4-amino-3,5,6-trichloropicolinate,
2-(dimethylamino)ethyl 4-amino-3,5,6-trichloropicolinate,
p-nitrophenyl 4-amino-3,5,6-trichloropicolinate,
4-pyridyl 4-amino-3,5,6-trichloropicolinate,
2-(2-ethoxyethoxy)ethyl 3,5,6-trichloro-4-aminomethylpicolinate,
2,3,6-trichloro-4-pyridyl 3,5,6-trichloro-4-hydrazinopicolinate,
2-pyridyl 3,5,6-trichloro-4-hydrazinopicolinate,
2-(diethylamino)ethyl 3,5,6-trichloro-4-hydrazinopicolinate,
barium 4-amino-3,5,6-trichloropicolinate,
3,5,6-trichloro-4-propargylaminopicolinamide,
n-octadecylammonium 4-amino-3,5,6-trichloropicolinate,
n-dodecylammonium 4-amino-3,5,6-trichloropicolinate,
n-decylammonium 4-allylamino-3,5,6-trichloropicolinate, etc.

Other representative materials are illustrated in the working examples and by defining substituents appropriate for the N< in the 4-position and for Y in the 2-positon of Formula I as hereinafter more fully disclosed.

The apparent oxidation state of the amino nitrogen N< in Formula I is from −3 to 0. The free valences may be satisfied with radicals such as hydrogen, alkyl, alkenyl, alkynyl, hydroxyalkyl, aralkyl, cycloalkyl, amino, dialkylamino, guanyl, aminoalkyl, poly(aminoalkylene)aminoalkyl, pyridyl, pyrimidinyl, triazyl; alternatively, the free valences may be joined with a divalent group which with the nitrogen forms a heterocyclic ring such as ethyleneimine, trimethyleneimine, pyrrolidine, alkylpyrrolidine, piperidine, alkylpiperidine, piperazine, alkylpiperazine and morpholine. Moreover, the compounds of the present invention embrace those having two trichloropicolinic acid nuclei, joined either directly through the nitrogen or through a divalent group interconnecting the nitrogens; these compounds may be better illustrated by a modified formula

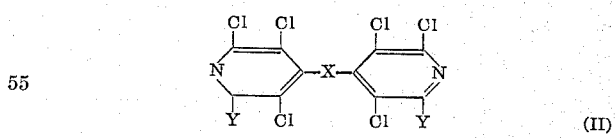

(II)

wherein X may be —NHNH—, —(NHC$_m$H$_{2m}$)$_x$NH—, —NHC$_n$H$_{2n}$NH—,

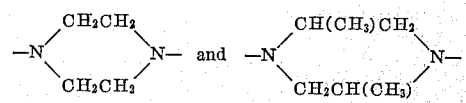

wherein m, n and x are integers from 1 to 4, inclusive, or alkylene diamines which may have aminoalkyl or hydroxyalkyl substituents.

The amino group in the above formula is a residue of nitrogen bases having a basic dissociation constant of at least 10$^{-7}$ and embrace residues of such bases as ammonia, aliphatic, alicyclic and heterocyclic mono and polyamines, as well as such basic or amino compounds as guanidine, hydrazine, and substituted hydrazine. Suitable aliphatic monoamines include mono- and dialkylamines,
alkenylamines,
alkynylamines,
hydroxylalkylamines
and aralkylamines such as
ethylamine,
n-propylamine,
isobutylamine,
sec.-butylamine,
sec.-amylamine,
2-methyl-n-butylamine,
1,3-dimethylbutylamine,
n-hexylamine,
3-amino-n-hexane,
4-amino-n-heptane,
2-amino-n-heptane,
n-nonylamine,
n-octylamine,
decylamine,
undecylamine,
dodecylamine,
tetradecylamine,
hexadecylamine,
1,1,3,3-tetramethylbutylamine,
2-amino-2-methylbutane,
pentadecylamine,
heptadecylamine,
hexahydrobenzylamine,
and other monoalkylamines containing from 1 to 18 carbon atoms, inclusive,
diethylamine,
diisopropylamine,
di-n-butylamine,
ethylmethylamine,
di-isoamylamine,
dioctylamine,
methylisopropylamine,
N-methyldecylamine,
N-methyl-sec.-butylamine,
N-methyldodecylamine,
N-methyltetradecylamine,
N-methyloctadecylamine,
N-ethyloctadecylamine,
ethylpropylamine,
N-n-butyltetradecylamine,
bis(1,3-dimethylbutyl)-amine,
N-methyl-2-amino-n-heptane,
di-n-heptylamine
and other dialkylamines containing from 2 to 20 carbon atoms, inclusive,
allylamine,
methallyamine,
oleylamine,
5-amino-1-pentane,
5-amino-2-hexane
and other alkenylamines containing from 3 to 18 carbon atoms, inclusive,
α-phenylethylamine,
β-phenylethylamine,
1-phenylpropylamine,
2-phenylpropylamine,
α-amino-n-butylbenzene,
3,5-dimethylbenzylamine,
3-phenylpropylamine,
α-amino-n-butylbenzene,
4-methylbenzylamine,
3-methylbenzylamine,
2-methylbenzylamine,
N-ethylbenzylamine,
N-methylbenzylamine
and other aralkylamines containing from 7 to 10 carbon atoms, inclusive,
2-aminopropyl alcohol,
3-amino-n-pentanol,
isopropanolamine,
2-amino-3-pentanol,
3-aminopropyl alcohol,
1-amino-2-butanol,
diethanolamine,
methylaminoethanol,
ethylaminoethanol,
isopropylaminoethanol,
n-butylaminoethanol,
bis($\beta$-hydroxypropyl)amine,
bis($\beta$-hydroxyethyl)amine
and other hydroxyalkylamines containing from 2 to 6 carbon atoms, inclusive, and propargylamine.

Suitable aliphatic polyamines include ethylenediamine,
diethylenetriamine,
triethylenetetramine,
tetraethylenepentamine,
propylenediamine,
3,3′-diaminodipropylamine,
1,3-diaminobutane,
unsym.-diethylethylenediamine,
sym.-diethylethylenediamine,
hexamethylenediamine,
tetramethylenediamine,
trimethylenediamine,
pentamethylenediamine,
1,2,3-triaminopropane,
1,3-diamino-2-propanol,
N-hydroxyethylpropylenediamine,
and other aliphatic polyamines containing from 2 to 8 carbon atoms, inclusive, and which may also contain a hydroxyl group.

Suitable alicyclic amines are cyclopropylamine,
cyclobutylamine,
cyclopentylamine,
cyclohexylamine,
2-ethylcyclohexylamine,
N-methylcyclohexylamine,
N-ethylcyclohexylamine,
dicyclohexylamine,
1,2-diaminocyclohexane,
2-aminocyclohexanol,
and other primary and secondary amines having from 3 to 6 carbon atoms in the cycloalkyl group and having a total carbon content of from 3 to 12, inclusive, and including hydroxy and amino substituted cycloalkylamines.

Suitable non-aromatic heterocyclic amines include ethyleneimine,
trimethyleneimine,
pyrrolidine,
piperidine,
2-methyl-pyrrolidine,
3-methylpyrrolidine,
hydroxyl group.
2-ethylpiperidine,
2,5-dimethylpyrrolidine,
2,4-dimethylpyrrolidine,
2-methylpiperidine,
3-methylpiperidine,
2,6-dimethylpiperidine,
4-ethylpiperidine,
2-ethylpiperidine,
2,2,4-trimethylpiperidine,
piperazine,
5-methyl-2-pyrazoline,
trans-2,5-dimethylpiperazine and morpholine.

Suitable "aromatic" heterocyclic nitrogen bases are 5 and 6 membered rings containing at least one —NH$_2$ radical and which may also contain from 1 to 2 methyl groups, such as 2-aminopyridine,
6-amino-α-picoline,
5-amino-α-picoline,
3-amino-γ-picoline,
4-aminopyridine,
3,4-diaminopyridine,
4-amino-2,6-dimethylpyridine,
2,4-diaminopyridine,
2,5-diaminopyridine,
2,6-diaminopyridine,
2-aminopyrimidine,
4-aminopyrimidine,
5-amino-3-methyl-1,2,4-triazole,
3-amino-1,2,4-triazole, etc.

Other basic nitrogen compounds, the residue of which may satisfy the amino group in the above identified formula include hydrazine, methyldrazine, unsymm.-dimethylhydrazine, ethylhydrazine, phenylhydrazine, allylhydrazine, etc.

The "carboxylic acid derived group" may be represented by the radicals —COOH, —COOM, —CN, —CONH$_2$, —CONHR$^1$, —CONR$^1$R$^2$, —CONHNH$_2$, —CONHNHR$^3$ and —COOR$^4$. In the above radicals, M represents a salt group inclusive of alkali and alkaline earth salts such as sodium, potassium lithium, magnesium, calcium, salts of other metals such as copper, iron, zinc, cobalt, nickel, ammonium and substituted ammonium salts such as methylammonium, trimethylammonium, dimethylammonium, ethylammonium, diethylammonium, triethylammonium, n-propylammonium, isopropylammonium, di-n-propylammonium, diisopropylammonium, bis(3-hydroxypropyl)ammonium, 3-hydroxypropylammonium, 2-hydroxypropylammonium, bis(2-hydroxypropyl)ammonium, tetramethylammonium, tetraethylammonium, etc. Preferred salts include inorganic salts as above enumerated, ammonium and substituted ammonium salts, which substituted ammonium salts are alkylamines salts and alkanolamine salts in which one or more alkyl groups may contain 1, 2 or 3 or 4, or from 1 to 24 carbon atoms or more, such as docosylammonium, octylammonium, dodecylammonium, octadecylammonium, etc., and in which one or more alkanol groups may contain 2 or 3 or 4, or from 2 to 6 carbon atoms, inclusive, such as tris(2-hydroxypropyl)ammonium, 2-hydroxyethylammonium, tris(2-hydroxyethyl)ammonium, etc. R$^1$ and R$^2$ in the amides are lower aliphatic radicals such as methyl, ethyl, n-propyl, isopropyl, 2-hydroxyethyl, allyl, crotyl, n-butyl, sec.-butyl, tert.-butyl, methallyl, 3-hydroxypropyl, 2-hydroxypropyl, etc. Preferred N-substituted amides are those in which the total carbon content on the amide nitrogen derived from alkyl, hydroxyalkyl or alkenyl is at least 1 and may be up to about 10 carbon atoms. Thus, the substituent may contain 1, 2, 3 or 4 or up to 10 carbon atoms, preferably alkyl such as methyl, ethyl, n-hexyl, isoamyl, n-octyl, n-decyl, etc. When the amides are disubstituted amides, the sum of R$^1$ and R$^2$ preferably contains from 2 to 10 carbon atoms, inclusive. R$^3$ may be methyl, ethyl, phenyl or allyl. R$^4$ of the ester group is a residue of a hydroxy compound obtained by the removal of the OH group. Suitable hydroxy compounds include methanol, isopropyl alcohol, sec.-butyl alcohol, amyl alcohol, hexanol, octyl alcohol, heptyl alcohol, lauryl alcohol, tetradecyl alcohol, allyl alcohol, oloyl alcohol, methallyl alcohol, crotyl alcohol, cetyl alcohol, stearyl alcohol, capryl alcohol, polyhydroxy alcohols such as ethylene glycol, polyethylene glycol, trimethylene glycol, ether alcohols of ethylene and alkylene glycols marketed under trade names such as Dowanols and Cellosolves, aralkyl alcohols such as benzyl and β-phenylethyl alcohol, nitroalcohols such as 2-nitropropanol, 2-nitroethanol, pyridinols, chloropyridinols, acetylenic alcohols such as 2-propargyl alcohol, 2-methyl-3-butynol-2, 3-methyl-1-pentynol-3, 3-butyne-1-ol, 2-butyne-1,4-diol, 2,4-hexadiyne-1,6-diol, 3,6-dimethyl-4-octyne-3,6-diol, and other hydroxy compounds such as dialkylaminoalcohols, 2,4-dichlorophenoxyethanol, 2,4,5-trichlorophenoxyethanol, 2-(2,4-dichlorophenoxy)propanol, 2-(2,4,5-trichlorophenoxy)propanol, phenol, pentachlorophenol, 4,6-dinitro-o-sec.-amylphenol, 4,6-dinitro-o-sec.-butylphenol, 4,6-dinitro-o-cresol, and mono- and polyhalophenols. Preferred esters include alkyl esters containing from 1 to 18 carbon atoms, inclusive, alkenyl esters containing from 3 to 18 carbon atoms, inclusive, glycol esters derived from mono-, di- and polyglycols where the glycol contains from 2 to 3 carbon atoms in each glycol unit, such as propylene glycol, diethylene glycol, dipropylene glycol, polypropylene glycol, etc., mono- and diglycol lower alkyl, phenyl and chlorophenyl ether esters where the glycol is of the ethylene and propylene series and lower alkyl contains from 1 to 4 carbon atoms, inclusive, and chlorophenyl contains from 1 to 3 chlorine atoms, inclusive, aralkyl esters preferably containing 7 or 8 carbon atoms, mononitroalkyl esters containing from 2 to 3 carbon atoms, inclusive, pyridyl esters such as 4-pyridyl or 2-pyridyl, chloropyridyl esters containing from 1 to 4 chlorine atoms such as 2,3,6-trichloro-4-pyridyl, 2,3,5,6-tetrachloro-4-pyridyl, 2,6-dichloro-4-pyridyl, etc., alkynyl esters containing from 3 to 10 carbon atoms, inclusive, dialkylaminoalkyl esters containing from 4 to 10 carbon atoms, inclusive, such as dimethylaminoethyl, di(n-butyl)-aminoethyl, phenyl esters and halophenyl esters containing from 1 to 5 chlorine atoms, inclusive, such as p-chlorophenyl, 2,4,5-trichlorophenyl, 2,4,6-trichlorophenyl, 2,3,5,6-tetrachlorophenyl, etc., and nitroaryl esters containing from 1 to 2 nitro groups and from 0 to 1 alkyl group containing from 1 to 5 carbon atoms, inclusive, such as p-nitrophenyl, 2-nitro-p-cresyl, 6-nitro-o-cresyl, etc. Preferred ether alcohols of ethylene and alkylene glycols marketed under trade names such as Dowanols and Cellosolves may be represented by the formula —(C$_z$H$_{2z}$O)$_v$R$^5$ wherein R$^5$ is lower alkyl containing from 1 to 4 carbon atoms, inclusive, phenyl, or chlorophenyl containing from 1 to 3 chlorine atoms, inclusive, wherein z is an integer of from 2 to 3, inclusive, and v may be 1 or 2. Preferred glycols may be represented by —(C$_z$H$_{2z}$O)$_v$H with z and v having same values.

The products of the present invention are white to yellow crystalline solids or liquids, generally of low to moderate solubility in water and of moderate to high solubility in organic solvents such as acetone, xylene, ethanol, isopropyl alcohol, dimethylformamide and dimethyl sulfoxide.

The compounds of the present invention are useful for the control of pests such as mites and aphids as well as helminths. The compounds are also useful for plant growth control.

The products of the present invention which are free acids, i.e., compounds wherein Y in Formula I is —COOH and which may be called 4-amino-3,5,6-trichloropicolinic acid compounds, may be prepared by heating an appropriate 4-amino-2,3,5-trichloro-6-(trichloromethyl)pyridine compound represented by the formula

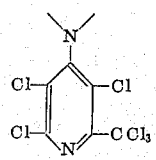

in aqueous acid to obtain the desired 4-amino-3,5,6-trichloropicolinic acid compound and hydrogen chloride by-product. Suitable strong acids for carrying out the hydrolysis include 50 to 80 percent aqueous sulfuric acid and concentrated phosphoric acid. The reaction is carried out in the temperature range of from about 80° C. to about 180° C. for a period of from 0.25 to 2 hours. During the heating a reaction takes place with the formation of the desired 4-amino-3,5,6-trichloropicolinic acid compound and hydrogen chloride by-product which evolves from the reaction mixture.

In carrying out the reaction, the appropriate 4-amino-2,3,5-trichloro-6-(trichloromethyl)pyridine compound is mixed with aqueous acid and the resulting mixture heated to about 80° C. to 120° C. whereupon a reaction starts to take place with a vigorous evolution of hydrogen chloride by-product from the reaction mixture. External heat is removed until the intensity of gas evolution diminishes and then heating is continued with gradual increase in temperature to a range of from about 140° C. to about 160° C. and maintained in this temperature range for about 0.25 to 2 hours. At the end of this period, the reaction mixture is allowed to cool to room temperature and then added to a large volume of water or ice-water mixture to precipitate the desired 4-amino-3,5,6-trichloropicolinic acid compound. The latter is recovered by filtration and may be purified, if desired, by conventional procedures.

The free acids may also be prepared by an alternative method wherein the corresponding lower alkyl ester, prepared as hereinafter described, is hydrolyzed with aqueous base. The hydrolysis is conveniently carried out by heating the ester in dilute base such as aqueous alkali at reflux temperature until the reaction is substantially complete as observed by the dissolution of the ester in the aqueous medium. Thereafter, the mixture is cooled and acidified to precipitate the desired 4-amino-3,5,6-trichloropicolinic acid compound. The latter may then be recovered and purified according to conventional procedures.

The 4-amino-3,5,6-trichloropicolinic acid compounds which are esters, i.e., compounds wherein Y in Formula I is —COOR$^4$, may be prepared by reacting 4-amino-3,5,6-trichloropicolinic acid or a derivative thereof with an appropriate hydroxy compound having the formula, R$^4$OH. When R$^4$OH is alkanol or aralkanol containing from about 1 to about 10 carbon atoms, the ester may be prepared by mixing the acid and alcohol reactants together in the presence of an acid catalyst whereupon a reaction takes place with the formation of the desired 4-amino-3,5,6-trichloropicolinate ester product. Gaseous hydrogen chloride is conveniently employed as a catalyst, although other acids such as sulfuric acid, nitric acid, phosphoric acid, p-toluenesulfonic acid and oxalic acid may be added in catalytic amounts to the reaction mixture. With lower boiling alcohols, excess alcohol may be employed to serve as reaction medium. With higher boiling alcohols, an inert solvent such as benzene or xylene may be employed. The reaction takes place over a temperature in the range of from about 10° C. to about 150° C. or the boiling point of alcohol reactant or solvent. The amounts of the reactants are not critical but the reaction is facilitated by employing an excess of alcohol. The time is not critical and depends to some extent on the reaction temperature.

In a preferred method for carrying out the reaction, the appropriate 4-amino-3,5,6-trichloropicolinic acid compound and the appropriate hydroxy compound are mixed together and gaseous hydrogen chloride added thereto while maintaining the temperature below about 20° C. until the reaction mixture is saturated with hydrogen chloride. The mixture is then allowed to warm to room temperature and kept at room temperature for several hours, conveniently overnight. Thereafter, the unreacted alcohol and hydrogen chloride are removed by vaporization and the desired 4-amino-3,5,6-trichloropicolinate ester product recovered by conventional procedures.

The ester compounds of the present invention derived from lower alkanols may be prepared by an alternative method wherein the appropriate 4-amino-2,3,5-trichloro-6-(trichloromethyl)pyridine compound, an appropriate lower alkanol and water are reacted in the presence of silver nitrate to produce the desired ester product and silver chloride and nitric acid by-products. For satisfactory operation of this reaction, the 4-amino group preferably should be a substituted amino group. The exact amounts of the reactants are not critical; however, it is desirable that the alcohol, water and silver nitrate be employed in molar excess. The reaction is conveniently carried out at the reflux temperature of the reaction mixture for a time sufficient to complete the reaction as can be determined by cessation in the formation of silver chloride precipitate.

In carrying out the reaction, the appropriate 4-amino-2,3,5-trichloro-6-(trichloromethyl)pyridine and molar excess of silver nitrate, lower alkanol and water are heated together until no further reaction appears to be taking place as determined by silver chloride formation. Thereafter, concentrated hydrochloric acid is added portionwise to the reaction mixture to precipitate the unreacted silver nitrate as silver chloride. The precipitated silver chloride is removed by filtration and the filtrate vaporized with or without heat at atmospheric or reduced pressure to obtain the desired ester product. The latter may be purified, if desired, by conventional procedures.

Certain ester compounds such as those derived from hydroxy compounds wherein R$^4$OH is an alkenyl, alkynyl or aralkyl alcohol, are preferably prepared by another procedure wherein a salt, preferably an alkali metal salt is reacted with a halide corresponding to the alcohol to produce the ester product. Substantially equimolar proportions of the reactants are employed and the reaction is preferably carried out in an inert solvent such as dimethylformamide or dimethyl sulfoxide. The reaction may be carried out in the temperature range of from about 60° C. to about 160° C.

In carrying out the reaction, the appropriate alkenyl, alkynyl or aralakyl halide is added portionwise, preferably dropwise, to a warm solution of alkali metal salt of the 4-amino-3,5,6-trichloropicolinic acid and thereafter maintained in the temperature range of from about 60° C. to about 160° C. for several hours to obtain the desired ester product. The latter may be obtained from the reaction mixture by pouring the mixture into water to precipitate the 4-amino-3,5,6-trichloropicolinate ester product. The latter is recovered by filtration and purified, if desired, by conventional procedures.

The ester compounds of the present invention derived from hydroxy compounds which are phenols, pyridinols, polyglycol ether alcohols, dialkylaminoalkanols, and higher molecular weight alcohols, may be prepared from the corresponding acid chloride and appropriate hydroxy compound in the presence of tertiary amine to produce the desired ester product and hydrogen chloride by-product. The exact amounts of the reactants are not critical, some product being obtained in any case; usually substantially equimolar proportions of the reactants are employed. A large excess of water-miscible tertiary amine is used, the tertiary amine functioning not only to promote the reaction but also to act as a solvent medium. The tertiary amine also reacts with the hydrogen chloride by-product to form the tertiary amine hydrochloride salt. Suitable tertiary amines include pyridine, picoline, trimethylamine and triethylamine. Supplemental solvents such as benzene or xylene may also be employed. The reaction is carried out over a period of from about 1 hour to about 10 hours at temperatures ranging from room temperature to the boiling point of the solvent. The product may be isolated from the reaction mixture by pouring the mixture into cold, dilute aqueous alkali metal bicarbondate solution or water whereupon the desired ester compound of 4-amino-3,5,6-trichloropicolinic acid precipitates.

In carrying out preparation of the esters according to this method, the acid chloride is prepared as the first step of the reaction by warming together on a steam bath 4-amino-3,5,6-trichloropicolinic acid with a molar excess of thionyl chloride. The heating process is continued until the reaction is complete as evidenced by the cessation in the evolution of by-product gases, hydrogen chloride and sulfur dioxide, or for several hours. The mixture is then subjected to reduced pressure to remove the excess thionyl chloride and to recover a 4-amino-3,5,6-trichloropicolinyl chloride compound which is then used in the second step of the reaction.

The appropriate hydroxy compound is dissolved in excess tertiary amine base and thereafter, the 4-amino-3,5,6-trichloropicolinyl chloride compound, usually in benzene solution, is added portionwise thereto. The mixture is allowed to react at a temperature in the range of from room temperature to the boiling point of the solvent for from about 1 hour to 10 hours and thereafter added slowly to cold water or to cold, dilute alkali bicarbonate to precipitate the desired ester compound of 4-amino-3,5,6-trichloropicolinic acid. The latter may then be recovered from the mixture by conventional procedures such as by filtration or extraction with a water-immiscible organic solvent.

The products of the present invention which are salts, i.e., Y in Formula I is —COOM, may be prepared by the reaction of the appropriate 4-amino-3,5,6-trichloropicolinic acid compound with the appropriate metal or ammonium or quaternary ammonium hydroxide or amine. In carrying out the reaction, substantially equivalent proportions of the acid and base are mixed together in a suitable solvent such as alcohol-water whereupon a reaction takes place with the formation of the desired salt product and water by-product. The salt may or may not be soluble in the reaction medium. If insoluble, it may be recovered by filtration; if soluble, it may be recovered by vaporizing off the solvent and water. The salt may be purified, if desired, by conventional methods.

Salts of metals which form difficulty soluble hydroxides, such as copper, may be prepared by an alternative procedure wherein an alkali metal salt of 4-amino-3,5,6-trichloropicolinic acid compound is reacted with a soluble mineral acid salt of said metal, such as chloride or nitrate to produce the said metal salts of 4-amino-3,5,6-trichloropicolinic acid compound. In such preparation, substantially equivalent proportions of alkali metal 4-amino-3,5,6-trichloropicolinate compound and said metal salt of mineral acid are stirred together in water or water-alcohol solvent at room temperature or with gentle warming for from 0.5 to several hours whereupon the desired metal salt of 4-amino-3,5,6-trichloropicolinic acid compound usually precipitates in the reaction mixture. The latter may be recovered by filtration and purified, if desired, by conventional procedures.

The products of the present invention which are amides, i.e., compounds wherein Y in Formula I is —CONH$_2$, —CONHR$^1$ or —CONR$^1$R$^2$, or which are hydrazides, i.e., compounds wherein Y is —CONHNH$_2$ or —CONHNHR$^3$, may be prepared by reacting an appropriate 4-amino-3,5,6-trichloropicolinate ester compound, preferably, a lower alkyl ester with an appropriate nitrogen base. Thus, the amides are prepared by reacting the ester with ammonia, or appropriate amine, R$^1$NH$_2$ or R$^1$R$^2$NH; the hydrazides are prepared by reacting the ester with hydrazine or substituted hydrazine, R$^3$NHNH$_2$. The reaction may be carried out at a temperature of from about 15° C. to about 100° C. at atmospheric pressure or autogeneous pressure of the closed system. The amounts of the reactants are not critical; however, an excess of the ammonia, amine or hydrazine reactant is desirable. The reaction may be carried out in the presence of a solvent. Suitable solvents include alcohol or water or mixtures thereof. As a result of these steps the amide or hydrazide is obtained and may be recovered as residue by vaporizing off the solvent and/or unreacted nitrogen base. The product may then be purified by conventional procedures.

In carrying out the reaction, 4-amino-3,5,6-trichloropicolinate ester compound and appropriate nitrogen base are mixed together in an aqueous or alcoholic solvent and the resulting mixture heated at reflux temperature for several minutes whereupon a reaction takes place with the formation of the amide or hydrazide compound of 4-amino-3,5,6-trichloropicolinic acid. The mixture is then poured into water to precipitate the amide or hydrazide as a solid or liquid and the latter is thereafter recovered by conventional procedures.

The products of the present invention which are nitriles, i.e. compounds wherein Y in Formula I is —CN and which may be designated as 4-amino-3,5,6-trichloropicolinonitrile compounds, may be prepared by reacting an appropriate 4-amino-3,5,6-trichloropicolinamide compound wherein Y is —CONH$_2$ and prepared as above described with phosphorus pentoxide to produce the desired nitrile compound. From 1 to 2 molar proportions of phosphorus pentoxide is generally employed per mole of amide. The reaction is carried out by heating at elevated temperatures of from about 160° C. to 250° C. for several hours. The reaction may be carried out at pressures of from about 1 to 20 millimeters of mercury pressure to permit immediate removal of the nitrile product as it is formed or may be distilled after completion of the heating period.

In carrying out the reaction, the appropriate 4-amino-3,5,6-trichloropicolinamide compound and phosphorus pentoxide are mixed together and heated and then nitrile distilled under reduced pressure until substantially all of the material has distilled to obtain the desired 4-amino-3,5,6-trichloropicolinonitrile compound. The latter may be further purified by fractional distillation.

The compounds of the present invention may be prepared by adaptations of procedures known to the skilled in the art. Thus, it is to be understood that modifications or other methods known in the art for preparation of compounds having similar functional groups may be substituted for the above procedures.

The following examples illustrate the invention but are not to be construed as limiting.

*Example 1.—4-amino-3,5,6-trichloropicolinic acid*

A solution of 80% (weight percent) sulfuric acid, prepared by dissolving 278 milliliters of 95% sulfuric acid in 122 milliliters of water, was added to 278 grams (0.88 mole) of 4-amino-2,3,5-trichloro-6-(trichloromethyl)pyridine and the resulting mixture heated to 120° C. As a result of these operations, a reaction commenced as evidenced by foaming brought on by the evolution of hydrogen chloride by-product from the reaction mixture. The mixture was removed from the heat until the foaming subsided, thereafter heated with increase in temperature until a temperature of 160° C. was reached and maintained thereat for two hours. The resulting mixture was then cooled to room temperature and then added to 1500 milliliters of ice water to precipitate the desired 4-amino-3,5,6-trichloropicolinic acid product. The latter was recovered by filtration, and purified by dissolving in dilute aqueous sodium hydroxide, treating the alkaline solution with activated carbon, filtering the treated solution through diatomaceous earth and reacidifying to obtain a purified product melting at 218°–219° C. The yield of the purified product was 192.0 grams or 96 percent of theoretical.

*Example 2*

In similar preparations to that described in Example 1, the following compounds are prepared:

4-methylamino-3,5,6-trichloropicolinic acid as a white solid melting from 134° to 137° C., by heating together 4 - methylamino-2,3,5 - trichloro - 6 - (trichloromethyl) pyridine and 80 percent aqueous sulfuric acid.

4-piperidino-3,5,6-trichloropicolinic acid having a molecular weight of 310 by heating together 4-piperidino-2,3,5-trichloro-6-(trichloromethyl)pyridine and 80 percent aqueous sulfuric acid.

4-morpholino-3,5,6-trichloropicolinic acid having a molecular weight of 312 by heating together 4-morpholino-2,3,5-trichloro-6-(trichloromethyl)pyridine and 80 percent aqueous sulfuric acid.

4-di(normal-butyl)amino-3,5,6-trichloropicolinic acid having a molecular weight of 354 by heating together 4 - di(normal - butyl)amino - 2,3,5 - trichloro - 6 - (trichloromethyl)pyridine and 80 percent aqueous sulfuric acid.

4-isopropylamino-3,5,6-trichloropicolinic acid having a molecular weight of 284 by heating together 4-isopropylamino - 2,3,5 - trichloro - 6 - (trichloromethyl)pyridine and 80 percent aqueous sulfuric acid.

4-diethylamino-3,5,6-trichloropicolinic acid having a molecular weight of 298 by heating together 4-diethylamino - 2,3,5 - trichloro - 6 - (trichloromethyl)pyridine and 80 percent aqueous sulfuric acid.

4-tertiary-butylamino-3,5,6-trichloropicolinic acid having a molecular weight of 298 by heating together 4-tertiary - butylamino - 2,3,5 - trichloro - 6 - (trichloromethyl)pyridine and 80 percent aqueous sulfuric acid.

4-ethylamino-3,5,6-trichloropicolinic acid having a molecular weight of 270 by heating together 4-ethylamino - 2,3,5 - trichloro - 6 - (trichloromethyl)pyridine and 80 percent aqueous sulfuric acid.

4-diisopropylamino-3,5,6-trichloropicolinic acid having a molecular weight of 326 by heating together 4-diisopropylamino - 2,3,5 - trichloro - 6 - (trichloromethyl)pyridine and aqueous sulfuric acid.

3,5,6-trichloro-4-hydrazinopicolinic acid having a molecular weight of 256 by the reaction of 2,3,5-trichloro-4-hydrazino-6-(trichloromethyl)pyridine and phosphoric acid.

3,5,6-trichloro-4-(4-pentenyl)aminopicolinic acid having a molecular weight of 309 by the reaction of 2,3,5-trichloro - 4 - (4 - pentenyl)amino - 6 - (trichloromethyl)pyridine and phosphoric acid.

3,5,6-trichloro-4-n-hexadecylaminopicolinic acid having a molecular weight of 465 by the reaction of 2,3,5-trichloro - 4 - n-hexadecylamino-6-(trichloromethyl)pyridine and phosphoric acid.

3,5,6-trichloro-4-(4 - methylbenzyl)aminopicolinic acid having a molecular weight of 346 by the reaction of 2,3,5-trichloro - 4 - (4 - methylbenzyl)amino - 6 - (trichloromethyl)pyridine and sulfuric acid.

3,5,6-trichloro-4-(2 - hydroxyethyl)aminopicolinic acid having a molecular weight of 285 by the reaction 2,3,5-trichloro - 4 - (2 - hydroxyethyl)amino - 6 - (trichloromethyl)pyridine and sulfuric acid.

3,5,6-trichloro-4-(bis(2-hydroxypropyl))aminopicolinic acid having a molecular weight of 357 by the reaction of 2,3,5 - trichloro-4-(bis(2-hydroxypropyl))amino-6-(trichloromethyl)pyridine and phosphoric acid.

4,4' - ethylenediimino-bis(3,5,6-trichloropicolinic acid) having a molecular weight of 509 by the reaction of 4,4'-ethylenediimine - bis(2,3,5 - trichloro - 6 - (trichloromethyl)pyridine).

4,4'-hydrazobis(3,5,6-trichloropicolinic acid) having a molecular weight of 481 by the reaction of 4,4'-hydrazobis(2,3,5-trichloro-6-(trichloromethyl)pyridine).

4,4'-piperazine-bis(3,5,6-trichloropicolinic acid) having a molecular weight of 535 by the reaction of 4,4'-piperazino-bis(2,3,5-trichloro-6-(trichloromethyl)pyridine).

*Example 3.—Methyl 4-amino-3,5,6-trichloropicolinate*

A methanolic silver nitrate solution, prepared by dissolving 17.4 grams (0.101 mole) of silver nitrate in 302 milliliters of methanol and 18 milliliters of water, was added to 8.0 grams (0.027 mole) of 4-amino-2,3,5-trichloro-6-(trichloromethyl)pyridine and the resulting mixture heated together at reflux temperature for 6.3 hours. At the end of this period, the reaction mixture was allowed to cool, and concentrated hydrochloric acid added thereto to precipitate the unreacted silver nitrate as silver chloride. The precipitate was removed by filtration and the filtrate subjected to reduced pressure to remove the solvent, and to recover as residue the desired methyl 4-amino-3,5,6-trichloropicolinate product. The latter was recrystallized from hexane-benzene mixture to obtain a purified product melting at 116°–118° C.

*Example 4.—4-amino-3,5,6-trichloropicolinic acid*

3.0 grams (0.011 mole) of methyl 4-amino-3,5,6-trichloropicolinate, prepared as above described, was added to an aqueous solution of sodium hydroxide, prepared by dissolving 2.0 grams of the base in 15 milliliters of water, and the resulting mixture heated with stirring until the mixture became an almost homogeneous solution. The mixture was filtered while hot to remove a small amount of undissolved solid and the filtrate allowed to cool to room temperature. The filtrate was then acidified with dilute hydrochloric acid to obtain the desired 4-amino-3,5,6-trichloropicolinic acid product as a light colored precipitate. The latter was recovered by filtration, washed with water and dried in a vacuum oven to obtain the desired product in a yield of 70.6 percent. The purified product had a melting point of 214°–215° C. The product had the following elemental analysis:

Calculated: carbon, 29.9; hydrogen, 1.24; chlorine, 44.0; nitrogen, 11.6. Found: carbon 30.19; hydrogen, 0.92; chlorine 44.09; nitrogen 11.7.

The infrared spectral pattern of the product was identical to that of 4-amino-3,5,6-trichloropicolinic acid prepared by the hydrolysis of 4-amino-2,3,5-trichloro-6-(trichloromethyl)pyridine.

*Example 5.—Methyl 3,5,6-trichloro-4-pyrrolidinopicolinate and 3,5,6-trichloro-4-pyrrolidonopicolinic acid*

In an operation carried out in a manner similar to that described in Example 3, 15.9 grams (0.0431 mole) of 2,3,5 - trichloro - 4 - pyrrolidino - 6 - (trichloromethyl)pyridine was heated for 6 hours at reflux temperature with methanolic silver nitrate solution containing 29.5 (0.173 mole) of silver nitrate in 259 milliliters of methanol to obtain the desired methyl 3,5,6-trichloro-4-pyrrolidinopicolinate product. The latter was recovered from the reaction mixture as previously described and purified by recrystallizing from methanol to obtain yellow crystals having a molecular weight of 309.6.

In a manner similar to that described in Example 4, 3 grams (0.01 mole) of methyl 3,5,6-trichloro-4-pyrrolidinopicolinate was added to sodium hydroxide in methanol-water and the mixture stirred for 6 hours and thereafter allowed to stand overnight. The mixture was filtered to remove unreacted solid and the filtrate acidified to obtain the desired 3,5,6-trichloro-4-pyrrolidinopicolinic acid as a yellow solid. The product after purification had a melting point of 146°–148° C.

*Example 6.—Methyl 3,5,6-trichloro-4-(dimethylamino)-picolinate and 3,5,6-trichloro-4-(dimethylamino)picolinic acid.*

In operations carried out in a manner similar to that described in Examples 3, 4 and 5, 22 grams (0.064 mole) of 2,3,5-trichloro-4-(dimethylamino)-6-(trichloromethyl)pyridine was heated with methanolic silver nitrate containing 44 grams (0.26 mole) of silver nitrate in 250 milliliters of methanol to obtain methyl 3,5,6-trichloro-4-(dimethylamino)picolinate having a molecular weight of 283.5.

3.0 grams (0.11 mole) of methyl 3,5,6-trichloro-4-(dimethylamino)picolinate was stirred for about 6 hours in alkaline methanol-water to hydrolyze the ester and thereafter acidified to obtain the desired 3,5,6-trichloro-4-(dimethylamino)picolinic acid product. 3,5,6-trichloro-4-(dimethylamino)picolinic acid product is a yellow solid having a melting point of 122°–124° C.

Example 7.—Isopropyl 3,5,6-trichloro-4-morpholinopicolinate

In an operation carried out in a manner similar to that described in Example 3, a solution of 17 grams (0.1 mole) of silver nitrate in 300 milliliters of isopropyl alcohol and 20 milliliters of water is added to 8 grams (0.02 mole) of 2,3,5-trichloro-4-morpholino - 6 - (trichloromethyl)pyridine and the resulting mixture heated together at reflux temperature for about six hours. Thereafter, the reaction mixture is allowed to cool, concentrated hydrochloric acid added thereto to precipitate the unreacted silver nitrate as silver chloride, the precipitate removed by filtration, and the filtrate evaporated to remove the solvent and to recover as residue, the isopropyl 3,5,6-trichloro-4-morpholinopicolinate product having a molecular weight of 354.

Example 8

In operations similar to that described in Example 3, the following compounds are prepared:

Normal-butyl 4-amino-3,5,6-trichloropicolinate having a molecular weight of 298 by the reaction of 4-amino-2,3,5-trichloro-6-(trichloromethyl)pyridine with a solution of silver nitrate in normal butyl alcohol.

Ethyl 4-diethylamino-3,5,6-trichloropicolinate having a molecular weight of 326 by the reaction of 4-diethylamino-2,3,5-trichloro-6-(trichloromethyl)pyridine with a solution of silver nitrate in ethanol.

Normal-propyl 4-methylamino-3,5,6-trichloropicolinate having a molecular weight of 298 by the reaction of 4-methylamino - 2,3,5-trichloro-6-(trichloromethyl)pyridine with a solution of silver nitrate in normal propyl alcohol.

Secondary - butyl 4-piperidino-3,5,6-trichloropicolinate having a molecular weight of 366 by the reaction of 4-piperidino-2,3,5 - trichloro - 6 - (trichloromethyl)pyridine with a solution of silver nitrate in secondary butyl alcohol.

Example 9.—Sodium 4-morpholino-3,5,6-trichloropicolinate 3.12 grams (0.01 mole) of 4-morpholino-3,5,6-trichloropicolinic acid prepared as described in Example 3, is added to an aqueous solution of 0.4 gram of sodium hydroxide in 20 milliliters of 50% aqueous ethanol and the resulting mixture heated at reflux temperature until a homogeneous solution is obtained. The pressure on the reaction mixture is then reduced and water and ethanol removed by distillation to recover as residue the desired sodium 4 - morpholino - 3,5,6 - trichloropicolinate product having a molecular weight of 334.

Example 10

In a manner similar to that described in Example 8, the following compounds are prepared:

Potassium 4 - diisopropylamine - 3,5,6 - trichloropicolinate having a molecular weight of 364 by the reaction of 4 - diisopropylamino - 3,5,6 - trichloropicolinic acid and potassium hydroxide.

Ammonium 4 - diethylamine - 3,5,6 - trichloropicolinate having a molecular weight of 315 by the reaction 4-diethylamino-3,5,6-trichloropicolinic acid and ammonium hydroxide.

Lithium 4 - di(normal - butyl)amino - 3,5,6 - trichloropicolinate having a molecular weight of 360 by the reaction of 4-di-normal-butyl)amino - 3,5,6 - trichloropicolinic acid and lithium hydroxide.

Trimethylammonium 3,5,6 - trichloro - 4 - dimethylaminopicolinate having a molecular weight of 328 by the reaction of 3,5,6 - trichloro - 4 - dimethylaminopicolinic acid and trimethylamine.

Tris(2 - hydroxylethyl)ammonium 3,5,6 - trichloro - 4 - (2 - hydroxyethyl)aminopicolinate having a molecular weight of 434 by the reaction of 3,5,6 - trichloro - 4 - (2-hydroxyethyl)aminopicolinic acid and triethanolamine.

Isopropylammonium 3,5,6 - trichloro - 4 - isopropylaminopicolinate having a molecular weight of 342 by the reaction of 3,5,6 - trichloro - 4 - isopropylaminopicolinic acid and isopropylamine.

Tetramethylammonium 3,5,6 - trichloro - 4 - methylaminopicolinate having a molecular weight of 328 by the reaction of 3,5,6 - trichloro - 4 - methylaminopicolinic acid and tetramethylammonium hydroxide.

Example 11.—Cupric bis(4-amino-3,5,6-trichloropicolinate) salt 10 grams (0.044 mole) of 4 - amino - 3,5,6 - trichloropicolinic acid was added to about 50 milliliters of aqueous sodium hydroxide solution. About the same volume of methanol was added to the resulting mixture with stirring, and there was obtained in the solution sodium 4 - amino-3,5,6-trichloropicolinate. An aqueous solution containing 2.8 grams (0.026 mole) of cupric chloride was then added to the methanolic solution and the stirring continued whereupon a green solid of cupric bis(4-amino-3,5,6-trichloropicolinate) started to precipitate immediately. The mixture was stirred at room temperature for about one hour to complete the reaction and thereafter the product recovered by filtration. Elemental analysis showed the copper content of the product to be 12.4 percent; the theoretical value is 11.7 percent.

Example 12

In similar preparations, the following salts are prepared:

Zinc bis(4 - amino - 3,5,6 - trichloropicolinate) having a molecular weight of 546 by the reaction of sodium 4-amino-3,5,6-trichloropicolinate and zinc chloride.

Ferric tris(4 - amino - 3,5,6 - trichloropicolinate) having a molecular weight of 777.3 by the reaction of sodium 4-amino-3,5,6-trichloropicolinate and ferric chloride.

Example 13.—4-amino-3,5,6-trichloropicolinamide 40 milliliters of concentrated ammonium hydroxide and 8.0 grams (0.03 mole) of methyl 4 - amino - 3,5,6 - trichloropicolinate were mixed together and heated at 60°–70° C. with stirring for about one-half hour. A further quantity of concentrated ammonium hydroxide was added and the resulting mixture allowed to stand overnight at room temperature. As a result of these operations there was obtained the desired 4 - amino - 3,5,6 - trichloropicolinamide which precipitates as a yellow solid. The latter was recovered by filtration, washed with water and recrystrallized from ethanol to obtain a purified product melting at 244°–245° C.

Example 14.—N-ethyl-3,5,6-trichloro-4-methylaminopicolinamide 4.5 grams (0.1 mole) of ethylamine is added to a solution of 5,4 grams (0.02 mole) of methyl 3,5,6 - trichloro-4-methylaminopicolinate in 15 milliliters of methanol and the resulting mixture heated at reflux temperature for about one hour. At the end of this period, the reaction mixture is allowed to cool and then added to water to precipitate an N-ethyl-3,5,6-trichloro - 4 - methylaminopicolinamide product. The latter is recovered by extracting with benzene followed by vaporizing off the benzene solvent. The molecular weight of the product is 283.

Example 15

In a manner similar to that described in Examples 13 and 14, and from esters prepared according to methods described in Examples 3 or 16, the following compounds are prepared:

N - isopropyl - 3,5,6 - trichloro - 4 - morpholinopicolinamide having a molecular weight of 353 by the reaction of isopropyl 3,5,6 - trichloro - 4 - morpholinopicolinate and isopropylamine.

N - isobutyl - 3,5,6 - trichloro - 4 - diethylaminopicolinamide having a molecular weight of 353 by the reaction of ethyl 3,5,6 - trichloro - 4 - diethylaminopicolinate and isobutylamine.

4 - amino - 3,5,6 - trichloropicolinic acid hydrazide having a molecular weight of 255.5 by the reaction of methyl 4 - amino - 3,5,6 - trichloropicolinate and hydrazine.

4 - amino - 3,5,6 - trichloropicolinic acid phenylhydrazide having a molecular weight of 331.6 by the reaction of methyl 4 - amino - 3,5,6 - trichloropicolinate and phenylhydrazine.

3,5,6 - trichloro - 4 - methylaminopicolinic acid methylhydrazide having a molecular weight of 283.6 by the reaction of methyl 3,5,6 - trichloro - 4 - methylaminopicolinate and methylhydrazine.

N - methyl - 4 - amino - 3,5,6 - trichloropicolinamide having a molecular weight of 255 by the reaction of methyl 4 - amino - 3,5,6 - trichloropicolinate and aqueous methylamine.

4 - tertiary - butylamino - 3,5,6 - trichloropicolinamide having a molecular weight of 297 by the reaction of methyl 4 - tertiary - butylamino - 3,5,6 - trichloropicolinate and ammonium hydroxide.

N - allyl - 4 - allylamino - 3,5,6 - trichloropicolinamide having a molecular weight of 320 by the reaction of methyl 4 - allylamino - 3,5,6 - trichloropicolinate and allylamine.

N,N - di - n - butyl - 4 - n - butylamino - 3,5,6 - trichloropicolinamide having a molecular weight of 409 by the reaction of butyl 4 - n - butylamino - 3,5,6 - trichloropicolinate and di-n-butylamine.

*Example 16.—Methyl 4-amino-3,5,6-trichloropicolinate*

10 grams (0.04 mole) of 4 -amino - 3,5,6 - trichloropicolinic acid was dissolved in 100 milliliters of anhydrous methanol and hydrogen chloride gas was introduced into the solution at 25° C. until the solution was saturated with hydrogen chloride. The reaction mixture was then allowed to stand overnight at room temperature. Thereafter, about three-fourths of the methanol was removed under reduced pressure and water added to the residue to precipitate the desired methyl 4-amino-3,5,6-trichloropicolinate product as a white crystalline solid. The latter was recovered by filtration and recrystallized from benzene to obtain a purified product melting at 118°–119° C.

*Example 17*

In a manner similar to that described in Example 16 and employing acids prepared in a manner described in Example 1, the following compounds are prepared:

Methyl 4 - tert. - butylamino - 3,5,6 - trichloropicolinate by the reaction 4 - tert. - butylamino - 3,5,6 - trichloropicolinic acid and methanol in the presence of hydrogen chloride.

Ethyl 3,5,6 - trichloro - 4 - diisopropylaminopicolinate by the reaction of 4 - diisopropylamino - 3,5,6 - trichloropicolinic acid and ethanol in the presence of hydrogen chloride.

Normal-propyl 3,5,6 - trichloro - 4 - pyrrolidinopicolinate by the reaction of 3,5,6 - trichloro - 4 - pyrrolidinopicolinic acid and normal propyl alcohol in the presence of hydrogen chloride.

4,4'-piperazino - bis(methyl 3,5,6 - trichloropicolinate) by the reaction of 4,4'-piperazino-bis(3,5,6-trichloropicolinic acid) and methyl alcohol.

*Example 18.—Propargyl 4-amino-3,5,6-trichloropicolinate*

10 grams (0.044 mole) of 4-amino-3,5,6-trichloropicolinic acid was added to a solution of 1.7 grams of sodium hydroxide in 15 milliliters of water and stirred. 50 milliliters of dimethylformamide was added to the resulting mixture and the temperature allowed to reach 60° C. 4.9 grams (0.042 mole) of propargyl bromide was added dropwise into the reaction mixture and the mixture heated to maintain the temperature at 100° C. for 2 hours. As the result of these operations, a brown solution formed which was allowed to cool to room temperature and then poured into water to precipitate the desired propargyl 4-amino-3,5,6-trichloropicolinate. The latter after recrystallization from benzene-hexane mixture had a melting point of 108°–110° C.

Elemental analyses (in percent) were as follows:
Calculated: carbon, 38.8; hydrogen, 1.79; chlorine, 3.82; nitrogen, 10.0. Found: carbon, 38.5; hydrogen, 1.68; chlorine, 38.28; nitrogen, 9.94.

*Example 19.—Phenyl 4-amino-3,5,6-trichloropicolinate*

15 grams (0.066 mole) of 4-amino-3,5,6-trichloropicolinic acid and 70 milliliters of thionyl chloride were mixed together and heated at reflux temperature for 2 hours. Thereafter, the excess thionyl chloride was removed under aspirator vacuum and a brown solid recovered as residue. The latter was recrystallized from benzene-hexane to obtain the desired 4-amino-3,5,6-trichloropicolynyl chloride intermediate as a yellow crystalline material melting at 114° C.

10.5 grams (0.0414 mole) of the acid chloride obtained as above described was dissolved in 20 milliliters of dry benzene and added over a 10 minute period to a vigorously stirred solution of 3.9 grams (0.041 mole) of phenol in 9.0 grams of pyridine. The stirring was continued for 0.5 hour to obtain the desired phenyl 4-amino-3,5,6-trichloropicolinate product. The latter was recovered by conventional procedures and had a melting of 149°–150° C.

*Example 20*

In a manner similar to that described in the preceding example, the appropriate acid is reacted with thionyl chloride to produce the corresponding acid chloride and the latter thereatfer reacted in pyridine with hydroxy compounds as set forth below to produce the following esters:

2-nitroethyl 3,5,6-trichloro-4-stearylaminopicolinate by the reaction 3,5,6-trichloro-4-stearylaminopicolinyl chloride and 2-nitroethanol.

Iso-octyl 3,5,6-trichloro-4-iso-octylaminopicolinate by the reaction of 3,5,6-trichloro-4-iso-octylaminopicolinyl chloride and isooctanol.

Benzyl 4-amino-3,5,6-trichloropicolinate by the reaction of 4-amino-3,5,6-trichloropicolinyl chloride and benzyl alcohol.

2,4-dichlorophenoxyethyl 3,5,6 - trichloro - 4 - methylaminopicolinate by the reaction of 3,5,6-trichloro-4-methylpicolinyl chloride and 2,4-dichlorophenoxyethanol.

Oleyl 3,5,6-trichloro-4-methylhydrazinopicolinate by the reaction of 3,5,6-trichloro-4-methylhydrazinopicolinyl chloride and oleyl alcohol.

2-nitropropyl 3,5,6-trichloro-4-morpholinopicolinate by the reaction of 3,5,6-trichloro-4-morpholinopicolinyl chloride and 2-nitropropanol.

Crotyl 4-amino-3,5,6-trichloropicolinate by the reaction of 4-amino-3,5,6-trichloropicolinyl chloride and crotyl alcohol.

*Example 21.—4-amino-3,5,4-trichloropicolinonitrile*

7.9 grams (0.033 mole) of 4-amino-3,5,6-trichloropicolinamide and 6.5 grams (0.046 mole) of phosphorus pentoxide were mixed together and then heated at about 235° C. for 3 hours. The reaction mixture was then distilled at reduced pressure to obtain as distillate a 4-amino-3,5,6-trichloropicolinonitrile product as white crystalline solid having a melting point of 240°–241° C.

*Example 22*

In a similar manner, the following nitriles are prepared from amides prepared as described in Examples 14 and 15:

3,5,6-trichloro-4-(diethylamino)picolinonitrile by heating together 3,5,6-trichloro-4-(diethylamino)picolinamide and phosphorus pentoxide.

3,5,6-trichloro - 4 - (2-pyridyl)aminopicolinonitrile by heating together 3,5,6-trichloro-4-(2-pyridyl)aminopicolinamide and phosphorus pentoxide.

3,5,6-trichloro-4-isopropylaminopicolinonitrile by heating together 3,5,6-trichloro-4-isopropylaminopicolinamide and phosphorus pentoxide.

The products of this invention have numerous agricultural applications. Thus, for example, the products are useful for the control of pests such as aphids and 2-spotted spider mites. In a representative operation, 100 percent controls were obtained when plants infested with bean aphids were contacted with an aqueous dispersion containing 500 parts by weight of 4-amino-3,5,6-trichloropicolinic acid per million parts of dispersion.

The products of the present invention are also useful as plant growth control agents. In such use, they are advantageously employed in controlling, inhibiting or arresting the growth of undesirable plants and weed seeds, both aquatic and terrestrial. The compounds of the present invention are also useful in general to the various purposes in the art of growth control or regulation for which plant hormones are suitable. For example, the compounds of the present invention and compositions containing compounds of the present invention may be employed to speed up the germination of seeds, and to stimulate the formation of roots, buds and flowers. They may also be used to produce seedless fruits without the use of pollen (parthenocarpy), and to prevent or retard the formation of the abscission layer on fruit trees, thereby preventing premature fruit drop. In other applications, such compositions may be used to cause fruit drop, set flowers or defoliate plants. In addition, the compounds and compositions thereof may be used to eradicate the lower or parasitic plants such as fungi. In such applications, the compounds may be employed either as the sole active ingredient in such compositions, as mixtures or in admixture with other plant growth control agents, hormones, contact herbicides, pesticides and/or modifying agents. The particular combination or composition to be employed will be guided by the particular results to be accomplished and is readily determined by the skilled in the art. Compositions may be applied to aerial portions of plants, to plant parts, to soil, to water adjacent to aquatic plants or to other natural or artificial plant growth media.

In representative operations for herbicidal use in single active ingredient applications against terrestrial plants, it is found that substantially complete controls of the unwanted growth of terrestrial plants German millet, sorghum, milo and pease are obtained when one of 4 - methylamino - 3,5,6 - trichloropicolinic acid, methyl 4-amino-3,5,6-trichloropicolinate, 4-amino-3,5,6-trichloropicolinic acid and 3,5,6-trichloro-4-dimethylaminopicolinic acid is applied to beds seeded with the above plant species.

In representative operations for the control of undesirable aquatic plants, sodium 4-amino-3,5,6-trichloropicolinate and 4-amino-3,5,6-trichloropicolinic acid were separately applied to separate tanks in which were growing pondweed, water hyacinth and alligator weeds at a rate sufficient to provide a concentration in the tanks of 2.0 parts by weight per million parts by weight of medium. Check tanks, also containing the same aquatic plants, were left untreated. All tanks were also stocked with goldfish. For a five-week period following application, both the plants and goldfish were closely observed. By the end of this period there was substantially complete kill of all plant species in treated tanks whereas the plants in the check tank were growing profusely. Observations showed no adverse effects to goldfish as a result of the treatments.

In a further embodiment, the products of the present invention, or compositions containing the same advantageously can be employed in combination with other plant growth modifying agents either as adjuvants or supplementary materials for both terrestrial and aquatic applications. Representative agents include 2-chloro-4,6-bis(ethylamino)-s-triazine; 2-chloro-4-ethylamino-6-isopropylamino - s - triazine; 2 - methoxy-4,6-bis(isopropylamino) - s - triazine; 3 - (p - chlorophenyl) - 1,1 - dimethylurea; 3 - (p - chlorophenyl) - 1,1 - dimethylurea acetate; 3 - phenyl - 1,1 - dimethylurea; 3 - phenyl - 1,1-dimethylurea trichloroacetate; 2, 4 - dichlorophenoxyacetic acid, its salts and esters; 2,4,5-trichlorophenoxyacetic acid, its salts and esters; 2-methyl-4-chlorophenoxyacetic acid, its salts and esters; 2-(2,4,5-trichlorophenoxy) propionic acid, its salts and esters; propylethyl-n-butylthiol carbamate; isopropyl N-(3-chlorophenyl)-carbamate; cis and trans 2,3-dichloroallyl-diisopropyl thiocarbamate; ethyl di-n-propylthiocarbamate; 4-chloro-2-butynyl N-(3-chlorophenyl)-carbamate; 2,3,6-trichlorobenzoic acid, its salts and esters; 2,3,5,6-tetrachlorobenzoic acid, its salts and esters; 2-methoxy-3,6-dichlorobenzoic acid, its salts and esters; 2,2-dichloropropionic acid, its salts and esters; trichloroacetic acid, its salts and esters; 4,6-dinitro-s-sec.-butylphenol; 3,5-dinitro-o-cresol; pentachlorophenol; 5-bromo-3-isopropyl-6-methyluracil; sodium arsenite, dimethylarsenic acid; tricalcium arsenate; sodium chlorate; sodium borates; 3,6-endoxohexahydrophthalic acid; O-(2,4-dichlorophenyl)-O-methyl isopropylphosphoramidothioate; 3,4-dichloropropionanilide; 1,2-dihydroxypyridazine-3,6-dione; 3-amino - 1,2,4 - triazole; 2,3,6 - trichlorophenylacetic acid, its salts and esters; 1,1'-ethylene-2,2'-dipyridylium dibromide; 2,6-dinitro-N,N-di-n-propyl-2,2,2-trifluoro-p-toluidine; α-chloro-N-diallylacetamide; herbicidal oils; and other inorganic salts and aliphatic, aromatic and heterocyclic organic compounds.

In representative operations of such embodiment, good controls of several species of broad and narrow leaf terrestrial plants are obtained when a mixture of a 4-amino-3,5,6-trichloropicolinic acid compound and a plant growth modifying agent of one of the class comprising triazine compounds, substituted phenyl urea compounds, phenoxy compounds, carbamate compounds, substituted benzoic acid compounds, halogenated aliphatic acid compounds, substituted phenol compounds, substituted uracil compounds, arsenical compounds and inorganic salts as above named, are applied to plants at a rate sufficient to supply from about 0.5 to about 15 pounds per acre of the aminotrichloropicolinic acid compound and from about 0.12 pound to about 4000 pounds per acre of the second plant growth modifying agent. Good results are also obtained at normal field application concentrations.

The products of the present invention are also useful for the control of helminths and insects attacking warm-blooded animals. Thus, the compounds are useful for the control of helminths such as tapeworm, ascarids, trichostrongyloids, and for insects such as ticks. In a representative operation for the control of helminths, methyl 4-amino-3,5,6-trichloropicolinate was fed to mice in the diet at a rate of 0.25 percent by weight for seven days, and the mice thereafter sacrificed and examined for tapeworm; complete controls of the helminths in the mice were observed.

The 4 - amino - 2,3,5 - trichloro-6-(trichloromethyl) pyridine starting materials employed in the preparation of the compounds of the present invention may be prepared by mixing together and reacting an excess of the appropriate amino compound and 2,3,4,5-tetrachloro-6-(trichloromethyl)pyridine at a temperature in the range of from about 15° to about 100° C. When the nitrogen base is a gas or low boiling amine, the reaction is preferably carried out in a sealed vessel at autogeneous pressure. With other nitrogen bases, the reaction is preferably carried out the reflux temperature of the base or solvent such as methanol, ethanol, isopropyl alcohol, toluene, etc. if the latter is employed. At the end of the reaction period, the 4-amino-2,3,5-trichloro-6-(trichloromethyl)pyridine compound starting material is recovered by conventional procedures. 3,4,5,6-tetrachloro-2-(trichloromethyl)pyridine is disclosed and claimed in copending application Serial No. 152,623.

The desirable compounds of the present invention may be represented by the formula

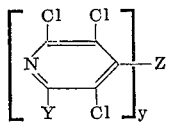

wherein Z is a residue of a nitrogen base having a basic dissociation constant of $10^{-7}$ or greater and Y is as previously defined and $y$ is an integer of at least 1 and may be as high as the number of basic nitrogens having a replaceable hydrogen in said nitrogen base. The preferred compounds of the present invention are those wherein in the above identified formula $y$ is an integer having the value of 1.

The preferred compounds of the present invention are aminotrichloropicolinic acid compounds which may be represented by the formula

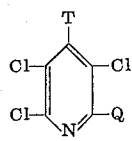

wherein T is selected from the group consisting of amino, hydrazino, lower alkylamino containing from 1 to 4 carbon atoms, inclusive, lower alkenylamino containing from 3 to 4 carbon atoms, inclusive, lower alkynylamino containing from 3 to 4 carbon atoms, inclusive, di(loweralkyl)amino wherein each alkyl contains from 1 to 4 carbon atoms, inclusive, and pyrrolidino; and Q is a carboxylic acid derived group selected from the group consisting of carboxylic acid represented by the formula —COOH; cyano (or nitrile) represented by the —CN; carboxylic acid salt represented by the formula —COOM' wherein M' is selected from the group consisting of alkali metals, alkaline earth metals, copper, ammonium and substituted ammonium where said substituted ammonium contains at least one substituent selected from the group consisting of alkyl containing from 1 to 18 carbon atoms, inclusive, and hydroxyalkyl containing from 2 to 4 carbon atoms, inclusive; carboxylic acid hydrazide represented by the formula —CONHNH$_2$; carboxylic acid amide represented by the formula selected from the group consisting of —CONH$_2$ and —CONHR' wherein R' is selected from the group consisting of alkyl containing from 1 to 8 carbon atoms, inclusive, hydroxyalkyl containing from 2 to 4 carbon atoms, inclusive, and alkenyl containing from 3 to 4 carbon atoms, inclusive; and carboxylic acid ester group represented by the formula —COOR" wherein R" is selected from the group consisting of alkyl containing from 1 to 18 carbon atoms, inclusive, alkenyl containing from 3 to 18 carbon atoms, inclusive, —C$_p$H$_{2p}$OR''' wherein R''' is selected from the group consisting of hydrogen, lower alkyl containing from 1 to 4 carbon atoms, inclusive, phenyl and chlorophenyl containing from 1 to 3 chlorine atoms, inclusive, and $p$ is from 2 to 3, inclusive, —C$_q$H$_{2q}$N(R'''')$_2$ wherein R'''' is lower alkyl containing from 1 to 4 carbon atoms, inclusive, and $q$ is from 2 to 3, inclusive, aralkyl containing from 7 to 8 carbon atoms, pyridyl, chloropyridyl containing from 1 to 3 chlorine atoms, inclusive, phenyl, halophenyl containing from 1 to 5 chlorine atoms, inclusive, and nitrophenyl containing from 1 to 2 nitro groups, inclusive.

For some applications, the preferred aminotrichloropicolinic acid compounds are those in which the carboxylic acid derived group is one of the following groups: a free carboxylic acid group; a cyano group; a hydrazide group in which the hydrazide is unsubstituted; a salt group which may be alkali metal, copper, ammonium or substituted ammonium, and when substituted ammonium, the substituent is preferably alkyl or hydroxyalkyl containing as many as 18 carbon atoms and wherein the ammonium nitrogen may contain from 1 to 4 substituents, inclusive; an ester group in which the radical derived from the hydroxy compound contains no more than about 10 carbon atoms and is inclusive of alkyl, alkenyl, alkynyl, aryl, aralkyl and pyridyl and which may contain a substituent such as hydroxy, dialkylamino, chloro, nitro or ether; an amide group in which the amide is unsubstituted or is an N-lower alkylamide containing no more than about 10 carbon atoms. Sometimes, aliphatic substituents in the ester groups are desirable. In addition, for many uses, the preferred compounds may be those in which the 4-position of the picolinic acid nucleus is unsubstituted 4-amino or loweralkyl-4-amino.

We claim:
1. An aminotrichloropicolinic acid compound having the formula

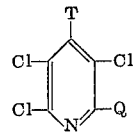

wherein T is selected from the group consisting of amino, hydrazino, lower alkylamino containing from 1 to 4 carbon atoms, inclusive, lower alkenylamino containing from 3 to 4 carbon atoms, inclusive, lower alkynylamino containing from 3 to 4 carbon atoms, inclusive, di(loweralkyl)amino wherein each alkyl contains from 1 to 4 carbon atoms, inclusive, and pyrrolidino; and Q is a carboxylic acid derived group selected from the group consisting of carboxylic acid represented by the formula —COOH; cyano represented by the formula —CN; carboxylic acid salt represented by the formula —COOM' wherein M' is selected from the group consisting of alkali metals, alkaline earth metals, copper, ammonium and substituted ammonium where said substituted ammonium contains at least one substituent selected from the group consisting of alkyl containing from 1 to 18 carbon atoms, inclusive, and hydroxyalkyl containing from 2 to 4 carbon atoms, inclusive; carboxylic acid hydrazide represented by the formula —CONHNH$_2$; carboxylic acid amide represented by the formula selected from the group consisting of —CONH$_2$ and —CONHR' wherein R' is selected from the group consisting of alkyl containing from 1 to 8 carbon atoms, inclusive, hydroxyalkyl containing from 2 to 4 carbon atoms, inclusive, and alkenyl containing from 3 to 4 carbon atoms, inclusive; and carboxylic acid ester group represented by the formula —COOR" wherein R" is selected from the group consisting of alkyl containing from 1 to 18 carbon atoms, inclusive, alkenyl containing from 3 to 18 carbon atoms, inclusive, —C$_p$H$_{2p}$OR''' wherein R''' is selected from the group consisting of hydrogen, lower alkyl containing from 1 to 4 carbon atoms, inclusive, phenyl and chlorophenyl containing from 1 to 3 chlorine atoms, inclusive, and $p$ is from 2 to 3 inclusive, —C$_q$H$_{2q}$N(R'''')$_2$ wherein R'''' is lower alkyl containing from 1 to 4 carbon atoms, inclusive, and $q$ is from 2 to 3, inclusive, aralkyl containing from 7 to 8 carbon atoms, inclusive, pyridyl, chloropyridyl containing from 1 to 3 chlorine atoms, inclusive, propargyl, phenyl, halophenyl containing from 1 to 5 chlorine atoms, inclusive, and nitrophenyl containing from 1 to 2 nitro groups, inclusive.

2. 4-amino-3,5,6-trichloropicolinic acid.
3. 3,5,6-trichloro-4-methylaminopicolinic acid.
4. 3,5,6-trichloro-4-pyrrolidinopicolinic acid.
5. 3,5,6-trichloro-4-dimethylaminopicolinic acid.
6. Methyl 4-amino-3,5,6-trichloropicolinate.

7. An aminotrichloropicolinic acid compound having the formula

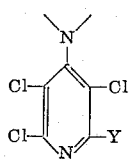

wherein Y is a carboxylic acid derived group selected from the group consisting of carboxylic acid represented by the formula —COOH; cyano represented by the formula —CN; carboxylic acid salt represented by the formula —COOM wherein M is selected from the group consisting of alkali metals, alkaline earth metals, copper, iron, zinc, cobalt, nickel, ammonium and substituted ammonium wherein said substituted ammonium contains at least one substituent selected from the group consisting of alkyl and hydroxyalkyl, said alkyl containing from 1 to 24 carbon atoms, inclusive, and said hydroxyalkyl containing from 2 to 6 carbon atoms, inclusive; carboxylic acid amide represented by a formula selected from the group consisting of —CONH$_2$, —CONHR$^1$ and

—CONR$^1$R$^2$ wherein R$^1$ and R$^2$ are independently selected from the group consisting of alkyl, hydroxyalkyl and alkenyl and wherein in the substituted amides the carbon content on the amide nitrogen is from 1 to 10 carbon atoms, inclusive; carboxylic acid hydrazide represented by the formula selected from the group consisting of

—CONHNH$_2$ and —CONHNHR$^3$ wherein R$^3$ is selected from the group consisting of methyl, ethyl, phenyl and allyl; carboxylic acid ester represented by the formula —COOR$^4$ wherein R$^4$ is selected from the group consisting of alkyl containing from 1 to 18 carbon atoms, inclusive, alkenyl containing from 3 to 18 carbon atoms, inclusive, —(C$_z$H$_{2z}$O)$_v$H and —(C$_z$H$_{2z}$O)$_v$R$^5$ wherein z is an integer of from 2 to 3, inclusive, v is an integer of from 1 to 2, inclusive, and R$^5$ is selected from the group consisting of lower alkyl containing from 1 to 4 carbon atoms, inclusive, phenyl and chlorophenyl containing from 1 to 3 chlorine atoms, inclusive, aralkyl containing from 7 to 8 carbon atoms, inclusive, mononitroalkyl containing from 2 to 3 carbon atoms, inclusive, pyridyl, chloropyridyl containing from 1 to 4 chlorine atoms, inclusive, alkynyl containing from 3 to 10 carbon atoms, inclusive, dialkylaminoalkyl containing from 4 to 10 carbon atoms, inclusive, phenyl, halophenyl containing from 1 to 5 chlorine atoms, inclusive, and nitroaryl containing from 1 to 2 nitro groups and from 0 to 1 alkyl group containing from 1 to 5 carbon atoms, inclusive; N< is an amino group wherein each of the free valences is connected to an atom selected from the group consisting of carbon, hydrogen and nitrogen, and wherein said amino group is a residue of a basic nitrogen compound having a basic dissociation constant greater than 10$^{-7}$ and selected rfom the group consisting of (a) ammonia, (b) monoalkylamines containing from 1 to 18 carbon atoms, inclusive, (c) dialkylamines containing from 2 to 20 carbon atoms, inclusive, (d) alkenylamines containing from 3 to 18 carbon atoms, inclusive, (e) alkynylamine containing 3 carbon atoms, (f) hydroxyalkylamines containing from 2 to 6 carbon atoms, inclusive, (g) aralkylamines containing from 7 to 10 carbon atoms, inclusive, (h) alkylene polyamines containing from 2 to 8 carbon atoms, inclusive, and inclusive of alkylenepolyamines containing from 0 to 2 substituents, inclusive, selected from the group consisting of amino, hydroxy, N-lower hydroxyalkyl and N-loweralkyl wherein lower is from 1 to 2 carbon atoms, (i) alicyclic amines containing from 3 to 6 carbon atoms, inclusive, in the carbocyclic ring and having a total carbon content of as much as 12 carbon atoms and inclusive of alicyclic amines containing from 0 to 1 substituent selected from the group consisting of lower alkyl, amino, hydroxy, N-lower alkyl and N-cyclohexyl wherein lower is from 1 to 2 carbon atoms, (j) alkyleneimines having a ring size of from 3 to 6 atoms, inclusive, a total carbon content of from 2 to 8, inclusive, and inclusive of alkyleneimines having from 0 to 3 lower alkyl substituents, inclusive, wherein lower is from 1 to 2 carbon atoms, (k) non-aromatic heterocyclic amines having a ring size of from 5 to 6 atoms wherein two of the atoms are nitrogen and the remainder carbon, and inclusive of amines containing from 0 to 2 methyl substituents, inclusive, (l) morpholine, (m) aromatic heterocyclic amines having a ring size of from 5 to 6 atoms of which from 1 to 3 atoms are nitrogen and the remainder carbon, and containing at least one amino radical and inclusive of amines containing an additional amino radical, and from 0 to 2 methyl radicals, inclusive, wherein the total carbon content is no greater than 7, (n) guanidine, (o) hydrazine, (p) lower mono- and dialkyl hydrazine containing from 1 to 2 carbon atoms, (q) phenylhydrazine, and (r) allylhydrazine.

8. 4-amino-3,5,6-trichloropicolinamide.
9. 4-amino-3,5,6-trichloropicolinonitrile.
10. Tris(2 - hydroxypropyl)ammonium 4 - amino-3,5,6-trichloropicolinate.

References Cited by the Examiner

FOREIGN PATENTS 1,239,786   7/1960   France.

OTHER REFERENCES

Lowy et al.: An Introduction to Organic Chemistry, Wiley 6th ed. (1945), pp. 213–215.

WALTER A. MODANCE, *Primary Examiner.*

JOHN D. RANDOLPH, *Examiner.*

ALAN L. ROTMAN, *Assistant Examiner.*